Oct. 6, 1931.    E. J. SWEETLAND    1,825,983
REPLACEABLE ELEMENT FILTER
Filed Sept. 21, 1926    2 Sheets-Sheet 2
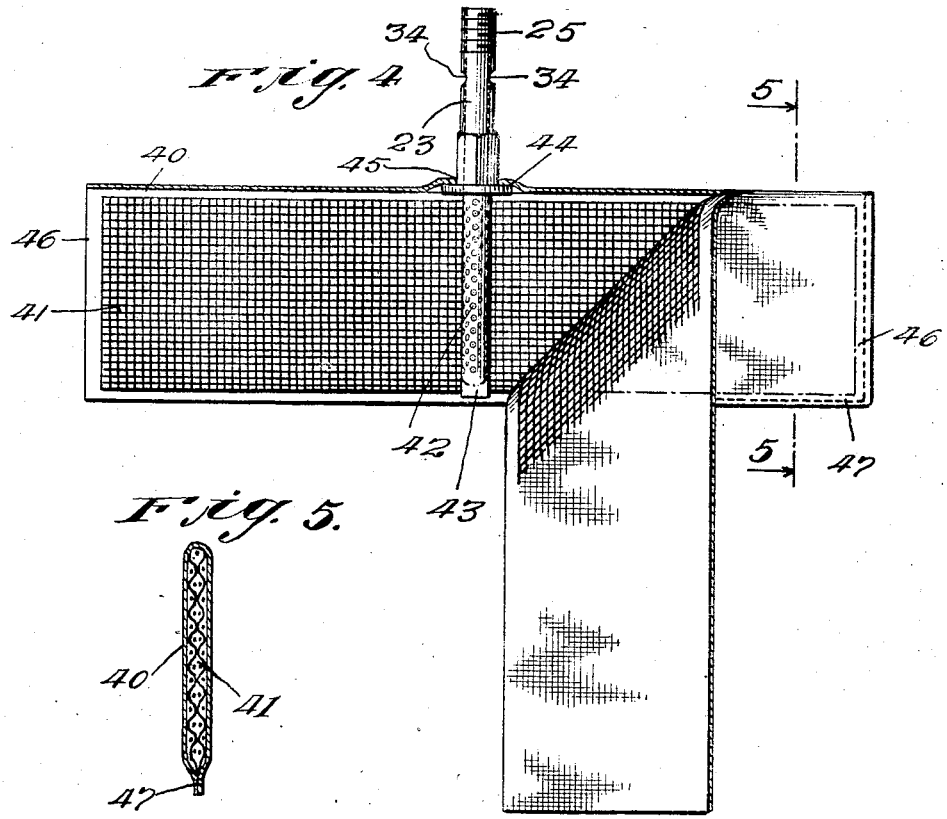
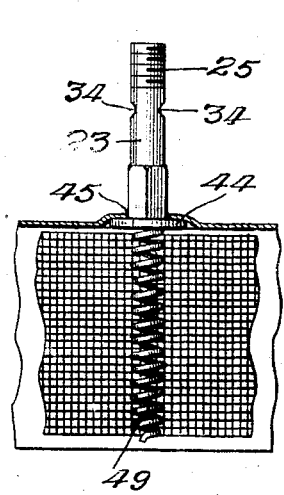
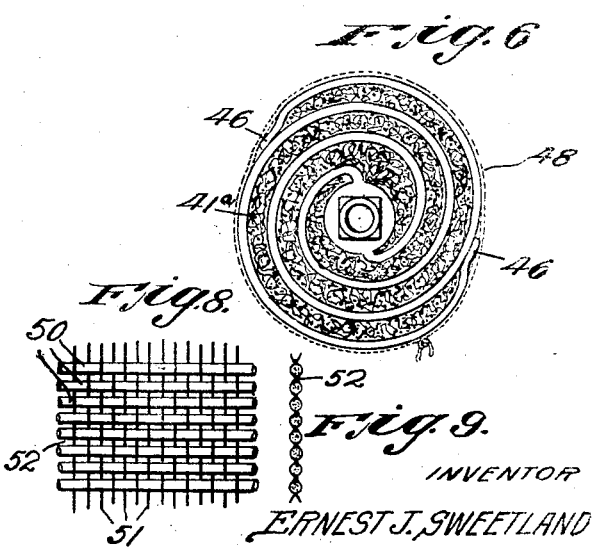
INVENTOR
ERNEST J. SWEETLAND
BY
ATTORNEYS Patented Oct. 6, 1931

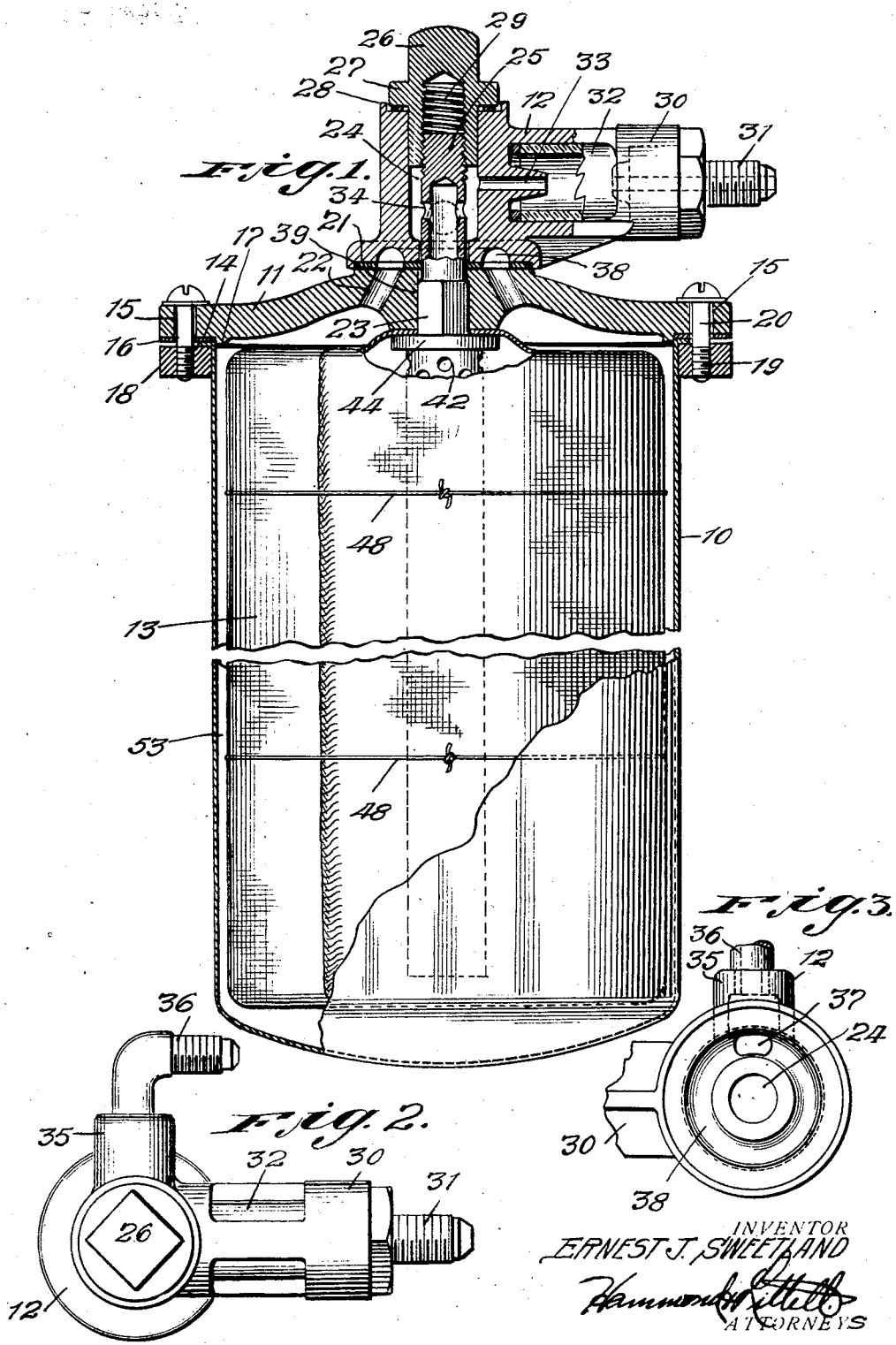

1,825,983

UNITED STATES PATENT OFFICE

ERNEST J. SWEETLAND, OF HAZLETON, PENNSYLVANIA

REPLACEABLE ELEMENT FILTER

Application filed September 21, 1926. Serial No. 136,757.

This invention relates to oil filters of the type particularly adapted to be used in the lubricating system of automotive internal combustion engines.

One of the objects of the invention is to provide a replaceable filter element for oil filters, which may be easily manufactured at low cost and which may be easily removed from and reinserted in the filter casing.

Another object of the invention is to provide a filter element which may be supported in the filter casing solely by the drainage member therefor.

Another object of the invention is to provide a joint fitting for both the inlet and outlet connections to the filter having a sight glass in the outlet connection.

Another object of the invention is to provide a means to secure an outlet and inlet fitting to the filter and to support the filter element inside the container by the adjustment of a single nut.

Another object of the invention is to provide a flexible drainage member for filter elements, which will permit folding or rolling of the filter element but will adequately space the sides of the element to permit free drainage therethrough.

Other objects and advantages of the invention will appear as the description proceeds.

One embodiment of the invention has been illustrated in the accompanying drawings, in which—

Fig. 1 is a sectional side elevatiton of the filter embodying the invention.

Fig. 2 is a plan view of the outlet and inlet fitting therefor.

Fig. 3 is a bottom view of the fitting.

Fig. 4 is a side view of a filter element embodying my invention, with a portion opened out to show the interior thereof.

Fig. 5 is a sectional view taken on the line 5—5 of Fig. 4.

Fig. 6 is a plan view of the element shown in Fig. 4, rolled and ready to be inserted in the container.

Fig. 7 shows a modification of the drainage tube, shown in Fig. 4.

Figs. 8 and 9 are plan and sectional views of a modification of the drainage or spacing element shown in Fig. 4.

Referring now more specifically to the drawings, the oil filter comprises a casing 10, a head 11, a combined inlet and outlet fitting 12, and a filter element 13. The casing 10, forming a part of the container, may be made of thin sheet metal pressed into shape, and is preferably cylindrical, as illustrated in the drawings. This casing has a flange 14 around the top edge, by which the casing is attached to the head 11.

The head 11 has a plurality of holes 15 around the edge thereof and a gasket 16 is held in place on the bottom face of the head 11, by an annular rib 17, which projects downwardly adjacent the outer edge of the head 11. A ring 18 is adapted to fit around the casing 10, beneath the flange 14, and has tapped holes 19, spaced to register with the holes 15 in the head 11. Screws 20 are adapted to fit into the tapped holes 19 and draw the ring toward the head 11, thereby bringing the flange 14 of the casing 10 tightly against the gasket 16 and the head 11, and forming a liquid tight joint, between the head and the gasket. The head 11 has an opening 21 in the center and several openings 22, spaced in a circle around the center. The opening 21 is adapted to receive the drainage member of the filter element and to form an outlet for the filtrate. This opening is squared in cross section and holds the drainage tube 23 from the filter element against rotation therein. The fitting 12 has an opening 24 through the center thereof into which the end of the drainage tube 23 is adapted to fit. The upper end of the drainage tube 23 is threaded at 25 and is adapted to be engaged by the nut 26 which fits rotatably within the opening 24 of the fitting 12, and has a shoulder 27, which is larger than the opening 24 in the fitting and is adapted to rest and bear against the upper part of the fitting, where the gasket 28 may be provided, to seal the top of the opening.

The nut 26 is internally threaded at 29 to receive the end 25 of the drainage tube 23. An extended portion 30, integral with the fitting 12, includes the outlet nozzle 31 and the sight glass 32, and communicates with the opening 24 in the fitting through a smaller hole 33.

The drainage tube 23 has openings 34 in the sides thereof, which permit the filtrate within the drainage tube to pass into the opening 24, through the hole 33, into the sight glass 32 and nozzle 31 on its return to the engine crank case.

A second projection 35 at the side of the fitting 12, receives the inlet nozzle 36 for the filter, and is provided with a hole 37 communicating with an annular groove 38 in the bottom face of the fitting 12.

The openings 22 in the casing head 11 are spaced from the center so that they will register with the groove 38 and form a path whereby the oil to be filtered may flow through the nozzle 36 into the projection 35 through the hole 37 into the groove 38 and from thence through the holes 22 into the casing of the filter. A gasket 39 may be interposed between the fitting and the casing head 11, to form a liquid-tight joint therebetween.

The filter element comprises a drainage tube 23, an envelope or bag 40 of filter cloth and a drainage or spacing member 41. The lower part of the drainage tube is perforated at 42, and preferably extends the entire width of the filter element. It is flattened at the extreme end 43 to facilitate sewing the filter cloth along the bottom of the envelope. A shoulder or flange 44 is attached to the drainage tube 23 to provide a means to seal the filter element where the drainage member passes through the cloth. The envelope or filter bag 40 is preferably formed from a rectangular sheet of filter cloth having a hole 45, large enough to admit the end of the drainage tube, in approximately the center thereof.

The drainage member 41 is composed preferably of a rectangular sheet of coarse burlap, a little smaller in size than the filter cloth and has a hole in the center thereof into which the drainage tube 23 is inserted. The filter bag and drainage member are folded over each side of the drainage tube and the filter cloth sewed at the ends 46 and along the bottom 47 to form a sealed envelope or filter bag. The drainage or spacing member of burlap or the like spaces the sides of the envelope away from each other and provides the drainage space for the filtrate to run toward the drainage tube 23, while at the same time it permits folding or flexure of the filter bag without interruption of the drainage therefrom.

By turning the drainage tube 23, the ends of the envelope of filter cloth may be rolled around the drainage tube in a double spiral, as illustrated in Fig. 6. To space the turns of the filter cloth from each other, spacing material 41a, such as excelsior, moss, corrugated screen wire, or the like, may be used. This material allows the dirty oil to pass easily therethrough so that all of the surface of the filter cloth is accessible to the oil. The filter element thus rolled, may be held in position by sewing the ends 46 against the adjacent turn of filter cloth, or strings 48 may be tied around the filter element, to hold the same in rolled condition. If desired, the drainage tube 23 may have its lower end composed of coiled wire 49, as shown in Fig. 7. This coil of wire takes the place of the perforated tube 42, and permits the filtrate to pass between the turns of the wire, while holding the filter cloth apart to form a tubular drainage passage.

Figs. 8 and 9 illustrate a modified form of drainage or spacing member, wherein the long threads 50, or those which extend from the drainage tube to the ends 46 of the filter cloth, are large and coarse, while the threads 51, which extend in the other direction, are fine, forming passages or channels 52 lengthwise of the filter, for the filtrate to more easily reach the drainage tube. The large threads, if desired, may be made of any fibrous material, such as raffia or other basket-making material, and the fine threads may be ordinary thread or fine wire. It will be understood that many other forms of flexible drainage or spacing materials may be used such as corrugated or flat screen wire, reticulated metal or the like.

To assemble the filter, the drainage tube 23, with the rolled bag 40 thereon, is inserted through the hole 21 in the container head and the fitting 12 is applied to the opposite or upper side of the head. The nut 26 is then turned so that the threads 29 engage the end 25 of the drainage tube and draw it up into the fitting, at the same time the fitting is drawn down against the head by tightening the nut, and a liquid-tight connection is made.

The drainage tube is drawn up into the fitting, until the shoulder or flange 44 contacts with the head 11 thereby holding the filter cloth between it and the head and sealing the filter envelope. The square sides of the drainage element 23 prevents the element from turning with the nut 26 and hold the filter element against shifting in the casing. The filter element, supported from the head 11, is then inserted in the casing 10 and the casing attached to the head 11 by screws 20 engaging the ring 18. A space 53 is preferably left between the sides of the filter element and the casing 10 to allow the oil coming from the openings 22 in the head to pass freely around the filter element.

When the filter element has become filled with dirt and is no longer efficient, the nut 26 may be loosened and the container and the filter element may be removed from the fitting. By loosening the screws 20, the head 11 may be lifted from the casing, the filter element removed and discarded and a new element inserted in its place after which the head may be attached to the casing again and the whole container attached to the fitting by turning the nut 26.

When in service, the oil is forced into the inlet 36, passes through the opening 37, groove 38 and openings 22, in the head 11, into the casing and around the filter cloth, passing freely through the spacing material 41a and contacting with all the surface of the filter cloth. The pure oil is forced through the filter cloth, leaving the impurities on the surface, and the filtrate passes along the threads of the drainage or spacing member 41 to the perforated drainage tube 42, up to the drainage tube 23, out the holes 34, into the opening 24 in the fitting, through the hole 33 into the sight glass 32, and out through the outlet nozzle 31 to the crank case of the engine.

While I have shown and described the filter as circulating the oil from the outside of the filter element through the filter cloth and out of the drainage element at the center, it will be readily understood that the filter will also function by reversing the circulation and admitting the oil into the filter through the drainage member 23 and allowing it to run along the threads of the burlap drainage lining 41, and filter out into the casing through the filter cloth.

Many modifications may be resorted to without departing from the spirit of the invention, and I do not therefore desire to limit myself to the specific modifications shown and described, but to interpret the invention broadly within the scope of the appended claims.

I claim:

1. A flexible drainage member for filter elements comprising fabric woven with coarse strands in the direction of flow of the filtrate and fine strands in the other direction.

2. A filter element comprising an envelope of filter cloth, a tubular drainage member and a drainage lining for said envelope composed of woven material with large coarse strands in the direction of the desired flow of filtrate and fine strands in the other direction to provide channels for the flow of the filtrate.

3. A filter element comprising an envelope of filter cloth, a tubular drainage member and a drainage lining for said envelope composed of coarse burlap, and means to aid in draining said envelope.

4. A filter element comprising an envelope of filter cloth, a lining for said envelope composed of coarse woven flexible material, said lining having channel-like passages, a tube communicating with the passages of the central inside portion of said envelope, the ends of said envelope being spirally wound around said tube, a coarse fibrous non-aggregated material between adjacent convolutions of said envelope and means to hold said envelope in spirally wound position.

5. A filter element comprising a rectangular envelope of filter cloth having an opening in one edge thereof, a lining for said envelope composed of coarse woven flexible material, a perforated tube within said envelope having one end passing through the opening in said envelope and the other end slightly flattened, and a shoulder on said tube inside said envelope and adjacent said opening.

6. A filter element comprising a rectangular envelope of filter cloth having an opening at substantially the midpoint of one of the long edges thereof, a lining for said envelope composed of coarse woven flexible material, a perforated tube within said envelope having its inner end flattened and the other end passing through said opening, and a shoulder on said tube adjacent said opening, and inside of said envelope.

7. A filter element comprising a rectangular envelope of filter cloth, having an opening at the midpoint of one of the long edges thereof, a lining of coarse woven flexible material therefor, a tube within said envelope and passing through the opening in said filter cloth, a shoulder on said tube within said envelope and adjacent to said opening, said tube having a plurality of perforations on that part of said tube which comes within said envelope, the ends of said envelope being spirally wound around said tube, coarse fibrous material between the convolutions of said envelope to separate the same, means to secure said element in said spirally wound position, and an outlet coupling to solely support said element.

8. A filter including a container and a filter element comprising a rectangular envelope of filter cloth having an opening at substantially the midpoint of one of the long edges thereof, a lining for said envelope composed of coarse woven flexible material, a perforated tube within said envelope having one end passing thru said opening and a shoulder on said tube adjacent said opening and inside of said envelope, and means to force said shoulder against the container to grip and seal said envelope.

9. A filter element comprising an envelope of filter cloth having an opening in one edge thereof, a drainage lining for said envelope, a non-rigid tube within said envelope having one end passing thru the opening in said envelope, said tube adapted to form a central transverse drainage channel, said envelope being adapted to be wound spirally about the drainage tube and a porous bulky mass adapted to be positioned between the spiral folds of the envelope.

10. A filter element comprising an envelope of filter cloth, a drainage tube between the ends of the envelope and extending into the envelope, a drainage lining within said envelope woven with large threads in the direction of flow within said element and with comparatively fine threads in the opposite direction, said envelope being adapted to be spirally wound about the central drainage tube, a porous bulky mass placed between the folds of said spiral, said filter element being adapted to be secured to a filter container by a single quick detachable nut cooperating with said drainage tube.

11. A filter adapted to be secured to a support, a filter element comprising a perforated tube, a shoulder on said tube, a drainage member mounted on said tube, a cloth filter envelope entirely supported by said tube, a flexible spacing material mounted within said envelope to space the sides thereof, said envelope being wound in a double spiral about said drainage member, means to space the spiral convolutions of said envelope one from the other whereby oil may pass through all portions of said envelope and a single nut to secure said drainage tube to said support and to seal said envelope between said shoulder and said support.

In testimony whereof I have affixed my signature to this specification.

ERNEST J. SWEETLAND.